(12) United States Patent
Logsdon et al.

(10) Patent No.: US 7,276,857 B2
(45) Date of Patent: Oct. 2, 2007

(54) METHODS AND APPARATUS FOR AN IMPROVED AMPLIFIER FOR DRIVING A NON-LINEAR LOAD

(75) Inventors: Timothy D. Logsdon, Livermore, CA (US); Richard Thao Ha, San Jose, CA (US)

(73) Assignee: Continuum Electro-Optics, Inc., Santa Clara, CA (US)

( * ) Notice: Subject to any disclaimer, the term of this patent is extended or adjusted under 35 U.S.C. 154(b) by 0 days.

(21) Appl. No.: 11/053,194

(22) Filed: Feb. 7, 2005

(65) Prior Publication Data

US 2005/0248291 A1 Nov. 10, 2005

Related U.S. Application Data

(60) Provisional application No. 60/569,207, filed on May 6, 2004.

(51) Int. Cl.
*H05B 37/00* (2006.01)
(52) U.S. Cl. .................................................. 315/200 A
(58) Field of Classification Search ................. 315/244, 315/241 P, 200 A, 241 R, 247, 246, 268, 315/271, 274, 276, 287, 291, 306
See application file for complete search history.

(56) References Cited

U.S. PATENT DOCUMENTS

| | | | |
|---|---|---|---|
| 5,416,387 A | 5/1995 | Cuk et al. ................... 315/209 |
| 5,650,694 A * | 7/1997 | Jayaraman et al. .......... 315/225 |
| 6,426,505 B1 * | 7/2002 | Rao et al. ................. 250/458.1 |
| 6,757,084 B2 * | 6/2004 | Kurita et al. ................ 358/509 |
| 6,791,273 B2 * | 9/2004 | Ito et al. ......................... 315/82 |

OTHER PUBLICATIONS

Michael T. Zhang, et al., "Analysis and Evaluation of Interleaving Techniques in Forward Converters", IEEE Transactions on Power Electronics, vol. 13, No. 4, Jul. 1998.

Christopher Bridge, "The Implication of Synchronous Rectifiers to the Design of Isolated, Single-Ended Forward Converters", Texas Instruments Incorporated 2002.

* cited by examiner

*Primary Examiner*—Shih-Chao Chen
*Assistant Examiner*—Minh Dieu A
(74) *Attorney, Agent, or Firm*—Paul Davis; Heller Ehrman LLP

(57) ABSTRACT

Methods and apparatus are provided for an amplifier for use with a nonlinear load. In one embodiment, a method is provided for driving a flash lamp. The method comprises providing an amplifier having a resonant reset topology, coupling an output of the amplifier to the flash lamp to provide a pulsed power output to the flash lamp, and driving the amplifier with a controller to provide a pulse width modulation output to the flash lamp. The pulsed output from the amplifier has a period selected to prevent a streamer of said flash lamp from extinguishing during an active use.

48 Claims, 15 Drawing Sheets

SIMPLIFIED INVERTER SECTION SCHEMATIC

MOSEFET Switch Drain Voltage

T0: SWITCH TURN ON
T1: SWITCH TURN OFF
T2: TRANSFORMER CORE RESET COMPLETE
T3: SWITCH ON (START OF NEXT CYCLE)
T0-T3: PWM PERIOD
T0-T1: SWITCH 'ON' TIME (VARIABLE TO CONTROL ENERGY)
T1-T2: RESONANT RESET TIME (RESET OF TRANSFORMER CORE)
T2-T3: DWELL TIME (OFF TIME PRIOR TO START OF NEXT CYCLE)

Switch Section On Time=2.4uS

PMW ON TIME=2uS (Y) YELLOW=MOSEFET GATE DRIVE (B) BLUE=MOSEFET DRAIN VOLTAGE (R) RED=LOAD CURRENT

Switch Section On Time=5uS

PMW ON TIME=4uS (Y) YELLOW=MOSEFET GATE DRIVE (B) BLUE=MOSEFET DRAIN VOLTAGE (R) RED=LOAD CURRENT

METHODS AND APPARATUS FOR AN IMPROVED AMPLIFIER FOR DRIVING A NON-LINEAR LOAD

CROSS-REFERENCE TO RELATED APPLICATION

The present application claims the benefit of priority from commonly assigned U.S. Provisional Application Ser. No. 60/569,207 filed May 6, 2004 now abandoned. This application is fully incorporated herein by reference for all purposes.

BACKGROUND OF THE INVENTION

1. Technical Field

The present invention relates to methods and apparatus for supplying power and is especially useful for supplying power to a highly dynamic load.

2. Background Art

Power supplies and amplifiers are well known in the art. A variety of configurations and topologies have been developed over the years to provide electrical power to a load. Loads that have widely varying impedances, however, provide a challenge to traditional power supplies driven by conventional techniques. One particular challenge involves finding a power supply or amplifier capable of supplying a variety of waveforms to drive a dynamic, widely varying load such as a flash lamp.

Flash lamps are of particular interest because of the difficulty of driving a flash lamp is the very dynamic nature of the load. When a flash lamp varies impedance to a point where the impedance is lower than the output impedance of the flash lamp, more energy is dissipated in the amplifier than in the load. This may end up (in other topologies) heating up of switches and the energy is dissipated as heat. For example, as current is sourced through the lamp, the impedance of the lamp changes in a negative way. With a fixed impedance load, as current is increased, the voltage drop across the fixed load proportionally increases also. With a flash lamp, this does not occur because the lamp becomes more conductive as more current is sourced into it. The voltage drop stays the same or it may go down (this is known as negative impedance). For most amplifiers, this has an appearance of a dead short occurring on the output. It appears as a varying load that is approaching a dead short at a very critical time. These qualities of a flash lamp make them particularly difficult to drive. Additionally, some known power supplies heat the flash lamps too quickly which may result in premature failure of the lamps.

Power supplies and amplifiers that can provide pulse width modulation output (PWM) are of particular interest. Some known configurations or topologies that can provide a PWM output to control power include push pull, bridge inverter, and flyback topologies. Known amplifiers with these topologies may provide rectangular pulses delivered to a transformer at a regular period. However, these known power supplies use rectangular pulses delivered to a transformer at a regular period and throttle the duty cycle forwards or backwards (greater or less) depending on the current need of the load. Most switching power supplies that are in many common place items are driven to operate in this manner.

Traditional resonant power supplies cannot provide variable energy per pulse. Rather the energy per pulse is fixed requiring fewer pulses per unit time be delivered to reduce output energy and more pulses per unit time to increase energy. This method in effect removes pulses which will cause the flash lamp to extinguish at low energy levels.

Traditional PWM controlled power supplies use switch on time duty cycle to control energy and thus offer limited control range.

Accordingly, there is an un-met need to provide power supplies and amplifiers that can be configured to generate variable waveforms and used to power a highly dynamic load such as a flash lamp.

SUMMARY OF THE INVENTION

One object of the present invention is to provide an improved amplifier capable of solving at least some of the drawbacks discussed above.

Another object of the present invention is to be able to withstand the appearance of a dead short occurring on the output amplifier.

A still further object of the present invention is to be able to provide switching power supplies that can withstand a load having positive and negative impedance.

Another object of the present invention is to be able to provide devices and methods synthesize a variety of waveforms and pulses.

Yet another object of the present invention is to provide an amplifier that is scalable and modular. The amplifier can be built with one or more modules, depending on the desired output power.

A still further object of the present invention is to provide an amplifier that can be scalable, and being like batteries, can be connected in series, parallel, and series parallel. Additionally, high power, complex networks can be built using combinations of series and parallel connected modules.

Another object of the present invention is to provide high frequency PWM directly to the lamp or other load and use the duty cycle of the PWM to control the power delivered to the load.

Another object of the present invention is to provide high frequency pulsed energy output directly to the lamp or other load and modulate the frequency or period to control power delivery to the load.

At least some of these and other objectives described herein will be met by embodiments of the present invention.

In one aspect of the present invention, an amplifier is provided that utilizes high frequency pulse width modulation (PWM) to provide precise control of electrical energy delivered to a dynamic load such as but not limited to a xenon filled flash lamp. In the present embodiment, the amplifier responds linearly to an analog input and provides proportional output power to the dynamic load. In one embodiment, the amplifier comprises of four circuit elements: an input section, a control section, one or more switch sections, and one or more output sections. The output sections provide electrical isolation facilitating direct connection of multiple sections to one load. The amplifier may be configured for a variety of loads using different connection combinations of output section wiring. As non-limiting examples, the output sections can be connected in series, parallel, or series-parallel combinations as desired. Furthermore, in some embodiments, switch sections can be driven at differing phase angles to provide desired peak versus average power profiles.

When used with a lamp, the amplifier of the present invention may use the lamp persistence to integrate the pulses of the PWM into a smooth output. Arc persistence of the lamp may function to integrate and filter the PWM.

It should be understood that embodiments of the present invention deliver energy to the load in a different manner than traditional power supplies. Typically those power supplies rectify the PWM output storing DC power in an output capacitor, then delivering DC power to a load. In some embodiments of the present invention, the present invention does not rectify and store energy (downstream from the transformer) before it goes to the lamp. The present invention may provide energy in the form of PWM directly to a flash lamp.

Because embodiments of the present invention use PWM, the end result is that the present invention can provide arbitrary waveforms comprised of an envelope consisting of a series of smaller pulses. The present invention may operate as a high frequency, pulse forming network, sending small energy pulses at a frequency in the range of about 100-300 Khz to the load. These small energy pulses are sent in bursts of a desired duration and are repeated at a desired repetition rate. Furthermore, the energy delivered in each of the smaller pulses can be independently controlled allowing control of the shape of the burst envelope. It should be understood that the typical, known method is to use a pulse discharge technique where a pulse forming network delivers one high energy, long duration pulse (100 to 300 µS FWHM) at repetition rates of 100 Hz or less. The shape and duration of a pulse delivered from this method is determined by fixed components in the pulse forming network and therefore can not be changed from one pulse to the next.

The present invention has a charging source which may be a bank of MOSFETs and the charge time is variable from 100 nS to 5 µS. The present invention moves into a different time domain. By creating a plurality of small pulses (100 ns to 5 µS) and varying their pulse width (duty cycle), the present invention can synthesize any waveform desired. The present invention may be viewed as a PFN that can operate very quickly that a user has more control over. The present invention may also be viewed as delivering a plurality of small flashes to the flash lamp instead of one large flash. The present invention may rely on arc persistence of the flash lamp to integrate the flashes. It should be understood that other filters or devices may be used to integrate the flashes. The present invention may be viewed as an amplifier that can provide a plurality of small pulses at a high frequency where the energy of each pulse is varied in response to an input signal. This feature and the arc persistence of the flash lamp allows the invention to synthesize a high energy arbitrary waveform. The feature also allows characterization of a given lamp to determine the impedance of that lamp throughout the operating power curve. This will allow optimization of the pulse shape to efficiently deliver energy to/from a specific lamp throughout the whole power curve. That is unique.

In one embodiment of the present invention, a method is provided for driving a flash lamp. The method comprises providing an amplifier having a resonant reset topology; coupling an output of said amplifier to said flash lamp to provide a pulsed power output to the flash lamp; and driving said amplifier with a controller to provide a pulse width modulation output to said flash lamp. The pulse width modulation output has a period selected to prevent a streamer of the flash lamp from extinguishing during an active use.

It should be understood that variation may be made without departing from the present invention. By way of example and not limitation, the output of the amplifier is coupled directly to the flash lamp without a filter to smooth the pulsed power output. The flash lamp pulse envelope may be a function of both the number of pulses beneath the envelope and the duration of each pulse due to the pulse width modulation. The period may be no more than 1/10th of an arc persistence time of the flash lamp. The period may be less than 20% of an arc persistence time of the flash lamp. The period may be less than 50% of an arc persistence time of the flash lamp. The period may be, in some embodiments, no greater than an arc persistence time of the flash lamp. The method may also include using at least one MOSFET switch in the amplifier. The method may include using at least three MOSFET switches in a switch section of the amplifier. The method may include using at least six MOSFET switches in a switch section of the amplifier.

In other embodiments, the method may include using a controller to vary output energy of the power supply, the controller varying at least one of the following to adjust energy output: varying the period of the amplifier or varying the duration of each pulse of the amplifier output. The controller may vary the output energy to be proportional to an input signal, the energy is proportional to an "on" time of a MOSFET switch during the period. The controller may vary the output energy to be proportional to an input signal.

The controller may be part of a feedback loop. The maximum "on" time of the MOSFET switch per period may be determined in part by a magnetic flux density of a transformer in the amplifier that is upstream from the output, wherein the flux density determines a saturation time for the transformer.

A transformer may be used in the amplifier and coupled to a MOSFET switch is a gapped transformer to increase time to transformer saturation. A transformer may be used in the amplifier and coupled to a MOSFET switch is an ungapped transformer.

The method may include transferring energy in a transformer in the switch, wherein the amount of energy delivered to the lamp is determined by a length of time that a MOSFET switch in the amplifier remains on and stores energy in a transformer in the amplifier. The method may include using a flash lamp to integrate and filter the pulse width modulation output of the amplifier to generate a smooth output curve.

The method may include using a filter upstream from the load to integrate and filter the pulse width modulation output of the amplifier to generate a smooth output curve. The method may include varying the duty cycle of the pulse width modulation to generate an output from the flash lamp proportional to an input signal. The method may include varying the duty cycle of the pulse width modulation to generate at least one of the following waveforms from the flash lamp: nonlinear, square, and/or arbitrary. The method may include driving the amplifier to provide at least 2 volts output to the flash lamp. The method may include driving the amplifier to provide at least 200 volts output to the flash lamp.

The method may include driving the amplifier to provide at least 500 volts output to the flash lamp. The method may include driving the amplifier to provide at least 900 volts output to the flash lamp.

The method may include driving the amplifier to provide at least 1000 volts output to the flash lamp.

The method may include driving the amplifier to provide at least 1500 volts output to the flash lamp.

The method may include coupling a second amplifier to provide a pulse width modulation output to the flash lamp. The method may include driving the second amplifier to provide an output in-phase with the output of the first amplifier.

The method may include driving the second amplifier to provide an output out-of-phase with the output of the first amplifier.

The method may include driving the second amplifier to provide an output out-of-phase with the output of the first amplifier, the out-of-phase output at one of the following phase angles: 180, 120, or 90.

The first amplifier may include a plurality of MOSFET switches.

The amplifier may be driven at a rep rate of about 100 to 300 kHz.

The fixed period may be selected to be less than about 5 ms.

The fixed period may be selected to be less than about 10 ms.

The method may include a controller to drive the amplifier in a discontinuous mode.

The method may include isolating the output of the amplifier from the flash lamp when the flash lamp is in a negative impedance mode.

The method may include isolating the output of the amplifier from the flash lamp during a non-energy transfer mode.

The amplifier may heat the flash lamp at a rate such that sputtering is minimized. The lamp may be a xenon lamp.

In another embodiment of the present invention, a system may be provided that includes a flash lamp having a flash lamp impedance and an arc persistence time when the flash lamp is lit; an amplifier having a topology for providing PWM power output directly to the flash lamp; and an amplifier driver configured to drive the amplifier, the driver having a fixed or variable frequency control that provides the PWM power output at a frequency such that the period of the power output does not exceed the persistence time of a flash lamp during energy delivery. The amplifier driver may be configured to drive the amplifier to provide a PWM output at a frequency of no slower than $1/10$th of a persistence time of a flash lamp.

In yet another embodiment of the present invention, a system may be provided comprising a flash lamp having a flash lamp impedance and an arc persistence time when the flash lamp is lit; an amplifier having a topology for providing PWM power output directly to the flash lamp; an amplifier driver configured to drive the amplifier, the driver having a fixed or variable frequency control that provides the PWM power output at a frequency such that the period of the power output does not exceed the persistence time of a flash lamp during energy delivery. The amplifier driver may be configured to drive the amplifier to provide a PWM output at a frequency of no slower than $1/10$th of a persistence time of a flash lamp.

In yet another embodiment of the present invention, a system may be provided comprising a flash lamp having a flash lamp impedance and an arc persistence time when the flash lamp is lit; an amplifier having a topology for providing a PWM power output directly to the flash lamp; and an amplifier driver configured to drive the amplifier to provide a PWM output at a frequency of no slower than a desired percentage of a persistence time of a flash lamp, the frequency selected so that an optical output of the flash lamp has less than 10% ripple.

In yet another embodiment of the present invention, a system may be provided comprising a flash lamp having a flash lamp impedance; an amplifier having a topology configured to provide a PWM power output to the flash lamp; wherein the amplifier has an output impedance that is less than the impedance of the lamp when the lamp is in a confined discharge mode.

In yet another embodiment of the present invention, a system may be provided comprising a flash lamp having a flash lamp impedance; and an amplifier having a topology configured to provide a PWM power output to the flash lamp, wherein the amplifier has a low output impedance, wherein the output impedance of the amplifier is less than $1/10$ of the impedance of the lamp when the lamp is in a confined discharge mode.

In yet another embodiment of the present invention, a system may be provided comprising a flash lamp having a flash lamp impedance; and an amplifier having a topology configured to provide a PWM power output to the flash lamp wherein the amplifier has a low output impedance, wherein the output impedance of the amplifier is less than $1/50$ of the impedance of the lamp in a confined discharge mode.

In yet another embodiment of the present invention, a system may be provided comprising an amplifier providing a PWM power output directly to the flash lamp; the amplifier having a topology wherein during a non-energy transfer portion, the impedance is at a level such that the amplifier output current is limited from the amplifier such that the peak current of a switch in the amplifier does not exceed the peak current rating of the switch.

In yet another embodiment of the present invention, a system is provided to power a dynamic flash lamp. The system comprises an amplifier providing a PWM power output directly to the flash lamp; an amplifier driver driving the amplifier in a mode, wherein the amplifier has a topology wherein during a non-energy transfer portion, the output of the amplifier is electrically isolated from the load.

In yet another embodiment of the present invention, a system is provided to power a dynamic flash lamp. The system comprises an amplifier providing a PWM power directly to the flash lamp; the amplifier having a topology wherein during a non-energy transfer portion, the amplifier has an impedance greater than 10000 times a minimum, dynamic impedance of the flash lamp.

In yet another embodiment of the present invention, a system is provided to power to a flash lamp. The system comprises an amplifier providing a PWM power output to the flash lamp; and an amplifier driver driving the amplifier in a discontinuous mode, wherein the amplifier has a topology wherein the output of the amplifier is electrically isolated from the flash lamp during a negative impedance state and tolerates a negative impedance of the load.

In yet another embodiment of the present invention, a system is provided to power a dynamic flash lamp. The system comprises an amplifier providing a PWM power output to the flash lamp, the amplifier comprising a plurality of amplifier modules each providing a power output; and an amplifier driver driving the amplifier in a discontinuous mode, and during a non-energy transfer portion, the output of the amplifier is electrically isolated from the load, wherein the electrical isolation allow for coupling multiple amplifier outputs together, the driver with logic for driving the amplifiers in a manner selected from one of the following: 1) increasing power by interleaving the drive of multiple amplifier modules or 2) lowering the impedance by simultaneously driving the connected amplifier modules.

In yet another embodiment of the present invention, a system is provided comprising a flash lamp having a flash lamp impedance; an amplifier having a resonant reset, forward converter topology, the amplifier configured to provide a PWM power output to the flash lamp; wherein the amplifier includes a number of switches that influences an output impedance of the amplifier, wherein the number of switches is selected so that the impedance is less than or equal to the flash lamp impedance. The switches may be MOSFET switches.

In yet another embodiment of the present invention, a system is provided comprising a flash lamp having a flash lamp impedance; an amplifier having a resonant reset, forward converter topology, the amplifier configured to provide a PWM power output to the flash lamp; wherein the amplifier includes a number of switches that influences an absolute reset time for the amplifier, wherein the number of switches is selected so as not to cause the reset time of the amplifier to exceed $1/10$th of the persistence time of the lamp.

In yet another embodiment of the present invention, a system is provided comprising a flash lamp having a flash lamp impedance; an amplifier having a resonant reset, forward converter topology, the amplifier configured to provide a PWM power output to the flash lamp; the amplifier having a transformer wherein magnetic characteristics of the transformer influences an absolute reset time of the amplifier, wherein the magnetic characteristics are selected so that the reset time is less than or equal to a desired percentage of a persistence time of the flash lamp.

In yet another embodiment of the present invention, a system is provided comprising a flash lamp having a flash lamp impedance and an arc persistence time when the flash lamp is lit; an amplifier having a resonant reset, forward converter topology, the amplifier configured to provide a PWM power output to the flash lamp; the amplifier having a transformer wherein the transformer is made of a core material which influences an absolute reset time of the amplifier, the core material selected so that such that the absolute reset time of amplifier is less than or equal to a desired percentage of a persistence time of the flash lamp.

In yet another embodiment of the present invention, a system is provided comprising a flash lamp having a flash lamp impedance and an arc persistence time when the flash lamp is lit; an amplifier having a resonant reset, forward converter topology, the amplifier configured to provide a PWM power output to the flash lamp; the amplifier having a transformer wherein each winding of the transformer provides a certain number of gauss and the number of windings affects the rise time of the transformer; wherein the rise time is selected so that such that the absolute reset time of amplifier is less than or equal to a desired percentage of a persistence time of the flash lamp or saturation time.

In yet another embodiment of the present invention, a system is provided comprising a flash lamp having a flash lamp impedance and an arc persistence time when the flash lamp is lit; an amplifier having a resonant reset, forward converter topology, the amplifier configured to provide a PWM power output to the flash lamp, wherein an output voltage is selected so that wavelength output from the flash lamp is substantially in the infrared wavelengths.

In yet another embodiment of the present invention, a device is provided comprising a flash lamp; an amplifier coupled directly to the flash lamp; wherein the power supply is configured to deliver a pulsed output to the flash lamp, the output comprising a plurality of pulses each being spaced apart by a period of time not to exceed an arc persistence time of the lamp; wherein the power supply is controllable to vary energy output directly to the flash lamp. The may include means for coupling a switch section to an output section, wherein the switch section includes means for switching.

In another embodiment of the present invention, a method is provided for manufacturing an amplifier for use with a dynamic load. The method comprises providing at least one switch section in the amplifier; providing at least one output section in the amplifier; providing a controller, wherein the switch section is controlled so that the output section delivers an energy output to the dynamic load, the output comprising a plurality of pulses each being spaced apart by a period of time, the controller configured to vary the width of each of the pulses in the period of time to vary the amount of energy delivered to the dynamic load. The method may include installing a plurality of MOSFET switches to adjust impedance of the amplifier. The method may include claim providing a transformer to transfer energy from the switch section to the output. The method may include providing about 25 joules per flash.

In another embodiment of the present invention, a system is provided for driving a non-linear load. The system comprises an amplifier receiving an input signal, wherein energy output of the amplifier is proportional to the analog input, the energy output comprising a plurality of pulses, the amplifier having an output recovery time sufficiently fast to enable another pulse to be delivered to the load prior to exceeding a persistence time of the load.

In another embodiment of the present invention, a system is provided powering a dynamic non-linear load. The system comprises an amplifier providing a PWM power output directly to the non-linear load; the amplifier having a topology wherein during a non-energy transfer portion, the impedance is at a level such that the amplifier output current is limited from the amplifier such that the peak current of a switch in the amplifier does not exceed the peak current rating of the switch.

In another embodiment of the present invention, a system is provided powering a dynamic non-linear load. The system comprises an amplifier providing a PWM power output directly to the non-linear load; an amplifier driver driving the amplifier in a mode, the amplifier having a topology wherein during a non-energy transfer portion, the output of the amplifier is electrically isolated from the load.

In another embodiment of the present invention, a system is provided powering a dynamic non-linear load. The system comprise an amplifier providing a PWM power output directly to the non-linear load; the amplifier having a topology wherein during a non-energy transfer portion, the amplifier has an impedance greater than 10000 times a minimum, dynamic impedance of the non-linear load.

In another embodiment of the present invention, a system is provided powering a dynamic non-linear load. The system comprise an amplifier providing a PWM power output to the non-linear load; an amplifier driver driving the amplifier in a discontinuous mode, wherein the amplifier has a topology wherein the output of the amplifier is electrically isolated from the non-linear load during a negative impedance state and tolerates a negative impedance of the load.

In another embodiment of the present invention, a system is provided powering a dynamic non-linear load. The system comprises an amplifier providing a PWM power output to the non-linear load, the amplifier comprising a plurality of amplifier modules each providing a power output; an amplifier driver driving the amplifier in a discontinuous mode, and during a non-energy transfer portion, the output of the amplifier is electrically isolated from the load, wherein the electrical isolation allow for coupling multiple amplifier outputs together, the driver with logic for driving the amplifiers in a manner selected from one of the following: 1) increasing power by interleaving the drive of multiple amplifier modules or 2) lowering the impedance by simultaneously driving the connected amplifier modules.

A further understanding of the nature and advantages of the invention will become apparent by reference to the remaining portions of the specification and drawings.

DESCRIPTION OF THE SPECIFIC EMBODIMENTS

It is to be understood that both the foregoing general description and the following detailed description are exemplary and explanatory only and are not restrictive of the invention, as claimed. It may be noted that, as used in the specification and the appended claims, the singular forms "a", "an" and "the" include plural referents unless the context clearly dictates otherwise. Thus, for example, reference to "a material" may include mixtures of materials, reference to "a resistor" may include multiple resistors, and the like. References cited herein are hereby incorporated by reference in their entirety, except to the extent that they conflict with teachings explicitly set forth in this specification.

In this specification and in the claims which follow, reference will be made to a number of terms which shall be defined to have the following meanings:

"Optional" or "optionally" means that the subsequently described circumstance may or may not occur, so that the description includes instances where the circumstance occurs and instances where it does not. For example, if a device optionally contains a feature for using a filtering device, this means that the filter feature may or may not be present, and, thus, the description includes structures wherein a device possesses the filtering feature and structures wherein the filtering feature is not present.

Figure 1:
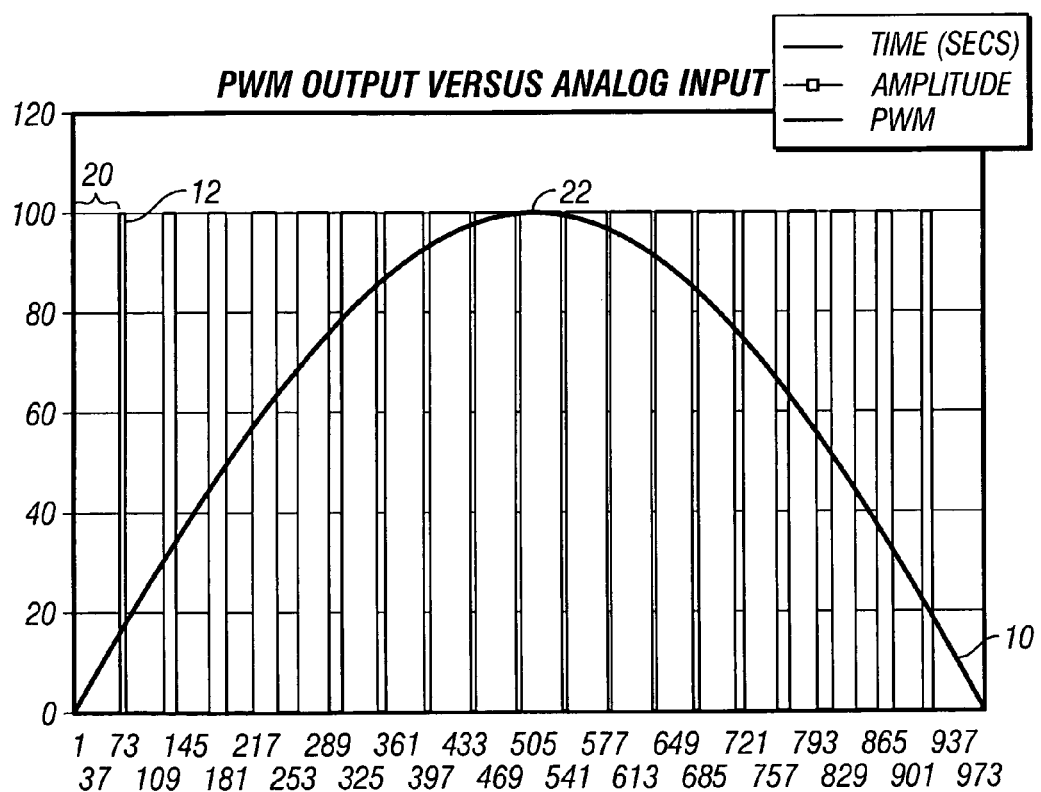
FIG. 1 is a graph of a PWM output to a load versus the analog input signal.

Referring now to FIG. 1, one method of using an amplifier to provide energy to a dynamic, non-linear load such as but not limited to a flash lamp will now be described. As seen in FIG. 1, the amplifier of the present invention may use PWM to control the amount of power delivered to the load over time. In the present application, the lamp filters the pulsed nature of the amplifier output and produces light output, which is proportional to the PWM duty cycle. The lamp power output is shown by curve 10. The output from the amplifier to the lamp is shown as a plurality of pulses 12.

In the present embodiment, the train of pulses 12 are at a fixed period 20 but variable duty cycle (ON-to-OFF state ratio) is delivered to the load. In other words, as seen in FIG. 1, the amount of time in each period 20 is fixed, but the amount of time that power (i.e. pulses 12) is delivered during each period 20 is variable. As the duty cycle ON time is increased, the power delivered to the load increases. In FIG. 1, this is indicated by the "wider" pulse 22 and the increased amplitude of line 10. It should be understood that the amplifier varies the duty cycle in response to an analog signal presented to the input and thus functions as an amplifier. For example, to provide a sinusoidal power waveform, the width of the pulses are varied. The pulses 22 are the actual energy being delivered to the lamp. In this embodiment, the period 20 is constant. Width of pulse 22 is the amount of time the switches are ON which determines the amount of power (energy/seconds) delivered to the lamp during the given pulse. In FIG. 1, the pulse ON times (widths) are increased at a sinusoidal rate and thus the power envelope delivered to the lamp is sinusoidal as indicated by line 10.

For a flash lamp driven by an amplifier according to the present invention, the period 20 is determined in part by the persistence time of the lamp. The persistence time is the length of time that the streamer in the lamp remains intact. In other words, it is the amount of time it takes for the gas in the lamp to recombine, ionization to cease, and the streamer to decay and extinguish. Knowing that time allows us to know what the maximum period (i.e lowest PWM frequency) could be. The period, along with the lamp persistence time also determines the amount of ripple in the light output from the lamp. Just as the lamp integrates the pulse train of the PWM into a smooth curve with some ripple, the laser rod integrates the optical ripple. For the present invention used to drive a flash lamp load, the length of each PWM period 20 should not exceed the persistence time of the flash lamp or else the lamp will need to be re-lit (i.e. charging the gas until the streamer reforms). Reducing the frequency (increasing period between pulses) will cause the streamer to extinguish.

In one embodiment, the period 20 may be about 1/10 the persistence time of the lamp, to minimize ripples in the optical output of the lamp. It should be understood that other time periods may also be selected, such as but not limited to 20% of the persistence time. Shorter time periods may be used without loss of the lamp streamer. Longer time periods (up to 100% of the persistence time) will introduce more ripple in the optical output of the lamp. It should be understood of course, that in some embodiments, the period is not fixed and may be of variable length, preferably not exceeding the arc persistence time when used to drive a lamp.

Figure 2:
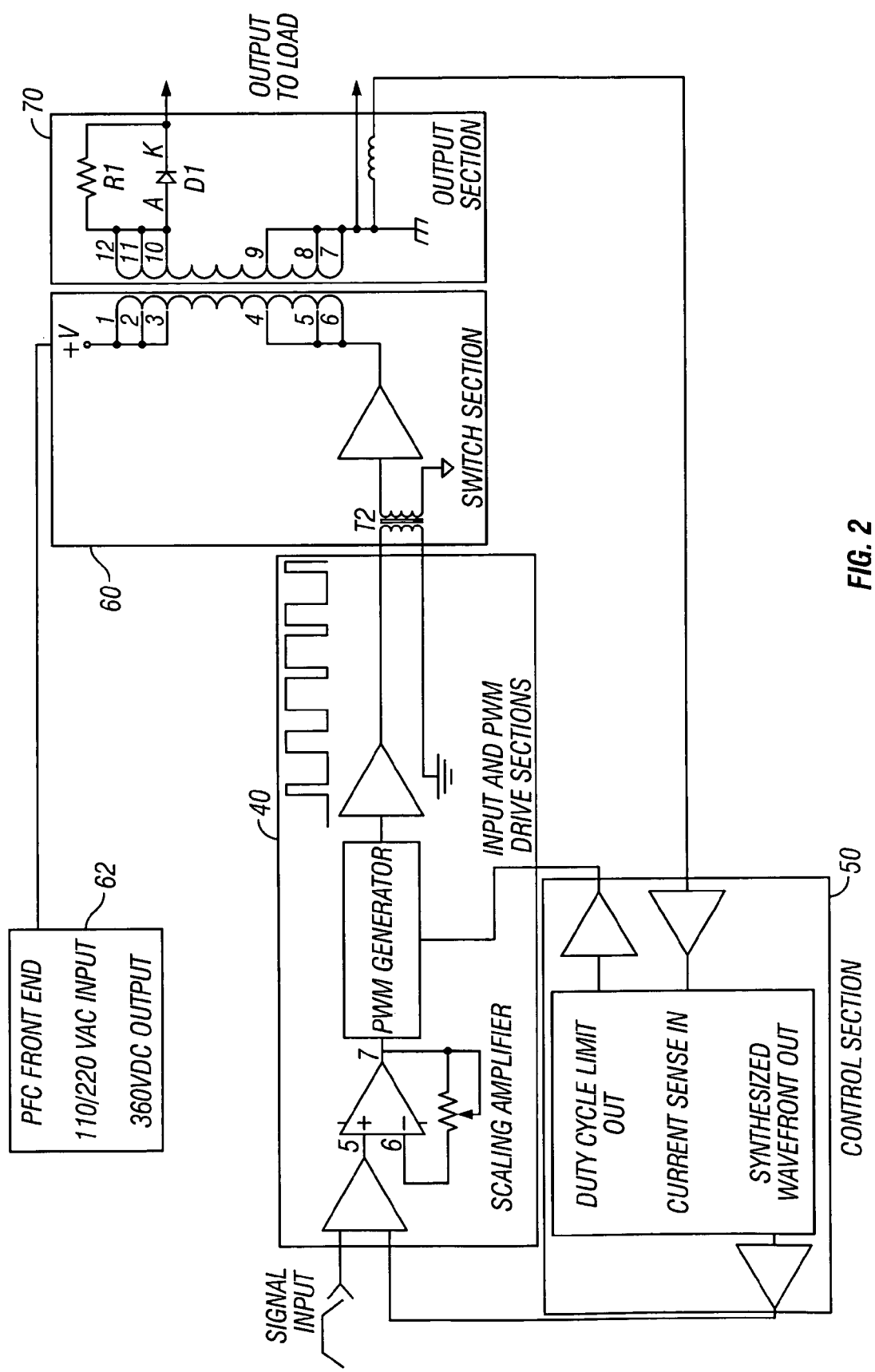
FIG. 2 is a schematic showing various modules for one embodiment of an amplifier according to the present invention.

Referring now to FIG. 2, one embodiment of an amplifier according to the present invention will now be described. FIG. 2 shows that this embodiment of the amplifier may have four basic circuit elements: an input section 40, a control section 50, a switch section 60, and an output section 70. In this embodiment, the switch section 60 receives DC power from a power factor corrected (PFC) front end 62. The input section 40 provides signal amplification and scaling of the input signal and generates a proportional pulse width modulated (PWM) output. In this embodiment, the control section 50 manages the output energy from the output section 70 by regulating the ON time of the PWM generated in the input section 40. The ON time of the switch section 60 will determine the amount of energy delivered to the load during each PWM period from the output section 70. The control section 50 also manages the overall pulse width and pulse repetition rate by gating bursts of the smaller PWM pulses.

Figure 3:
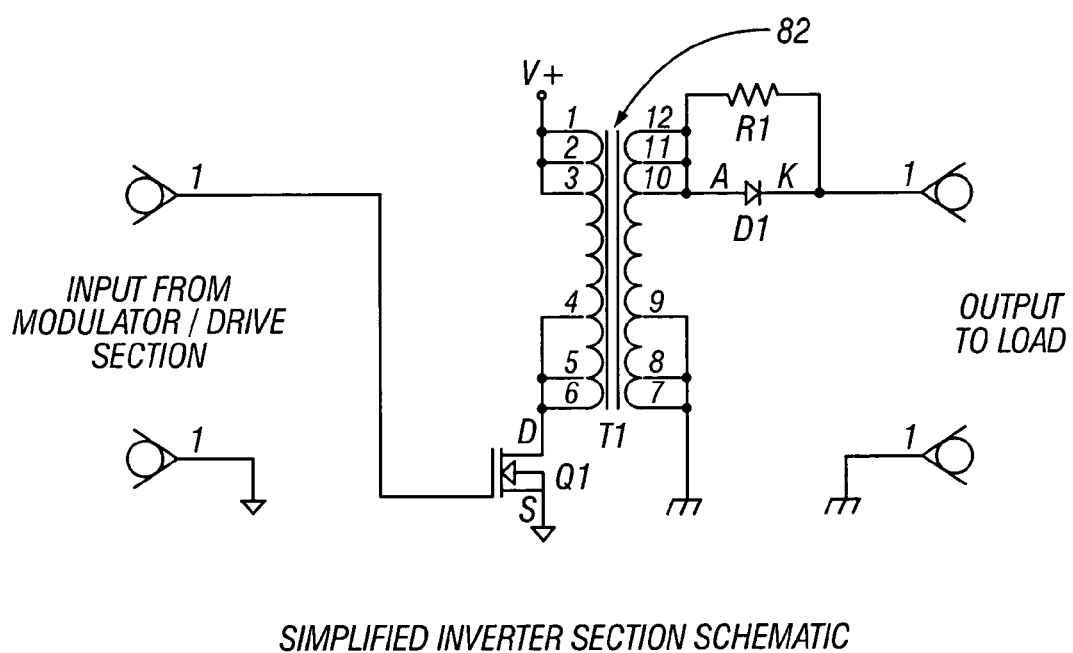
FIG. 3 shows a schematic of one embodiment of an inverter section according to the present invention.

Referring now to FIG. 3, the inverter portion of the present invention will be described in further detail. The inverter provides the switching and energy transfer elements controlled by control section 50. FIG. 3 shows that in this embodiment, the inverter section comprises a resonant reset, forward converter topology. This topology provides the benefits of typical non-resonant topologies such as PWM control, reasonable load/line variation tolerance and zero current on time switching. However, like a resonant topology, this design uses self-resonance to reset the core of transformer 82, which results in efficient off time switching. FIG. 3 shows a simplified schematic depicting the switch section 60 and output section 70 (the sections are denoted by broken lines) in the inverter section. The present topology includes at least one MOSFET switch 80 in switch section 60 and a forward inverter transformer 82 in the output section 70 that is used to transfer energy to the load.

Figure 4A:
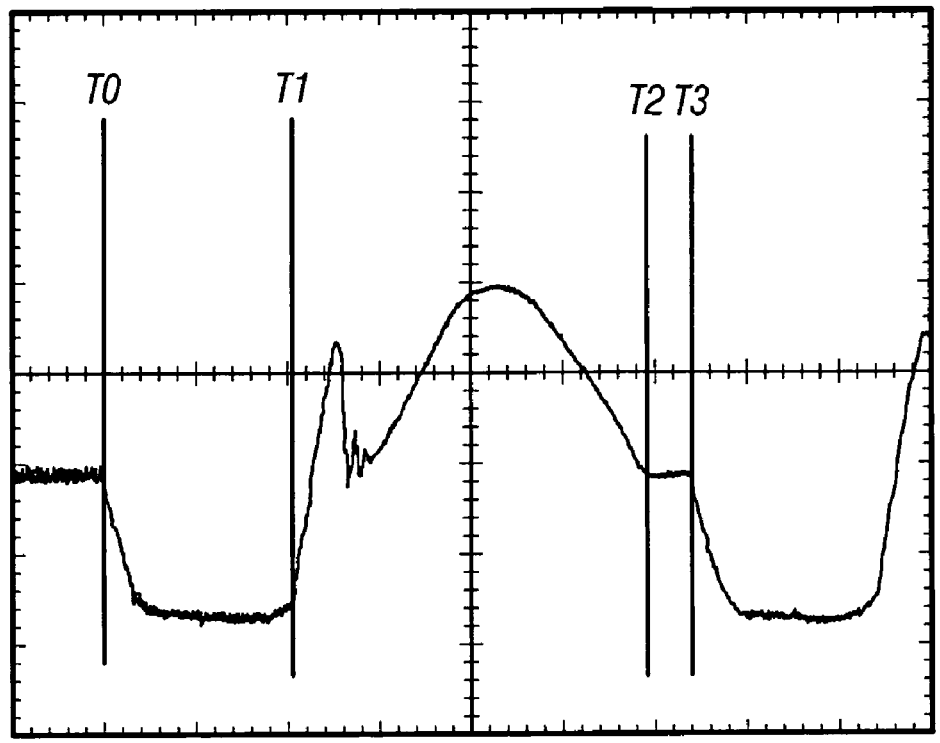
FIG. 4A is a graph of drain voltage for a switch used in one embodiment of the present invention.
Figure 4B:
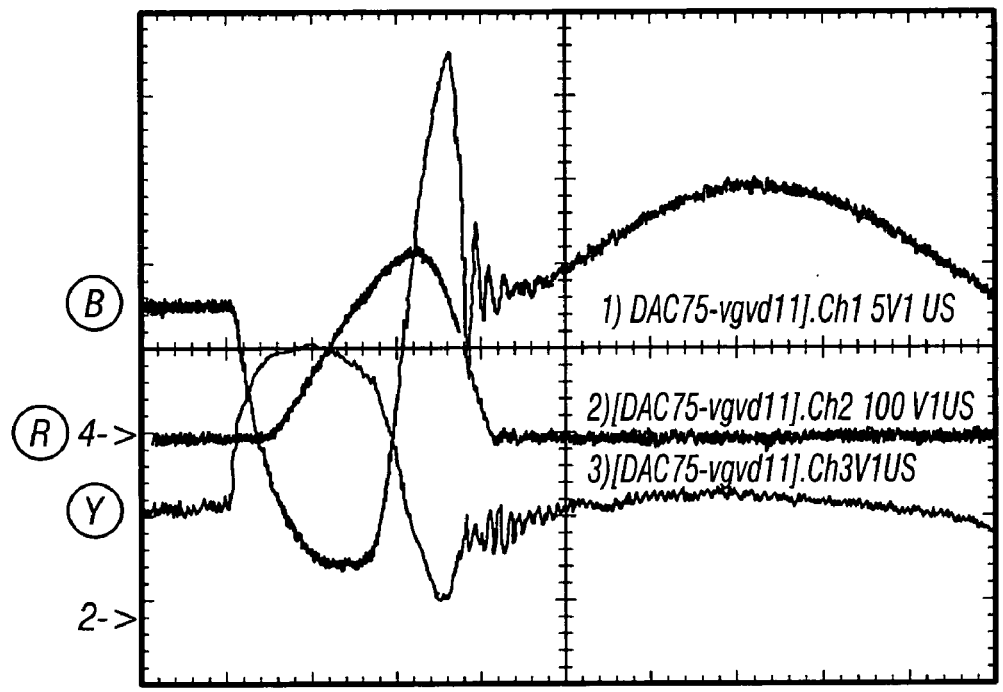
FIGS. 4B and 4C are graphs of multiple variables such as load current, drain voltage, and gate drive for a switch used in one embodiment of the present invention.
Figure 4C:
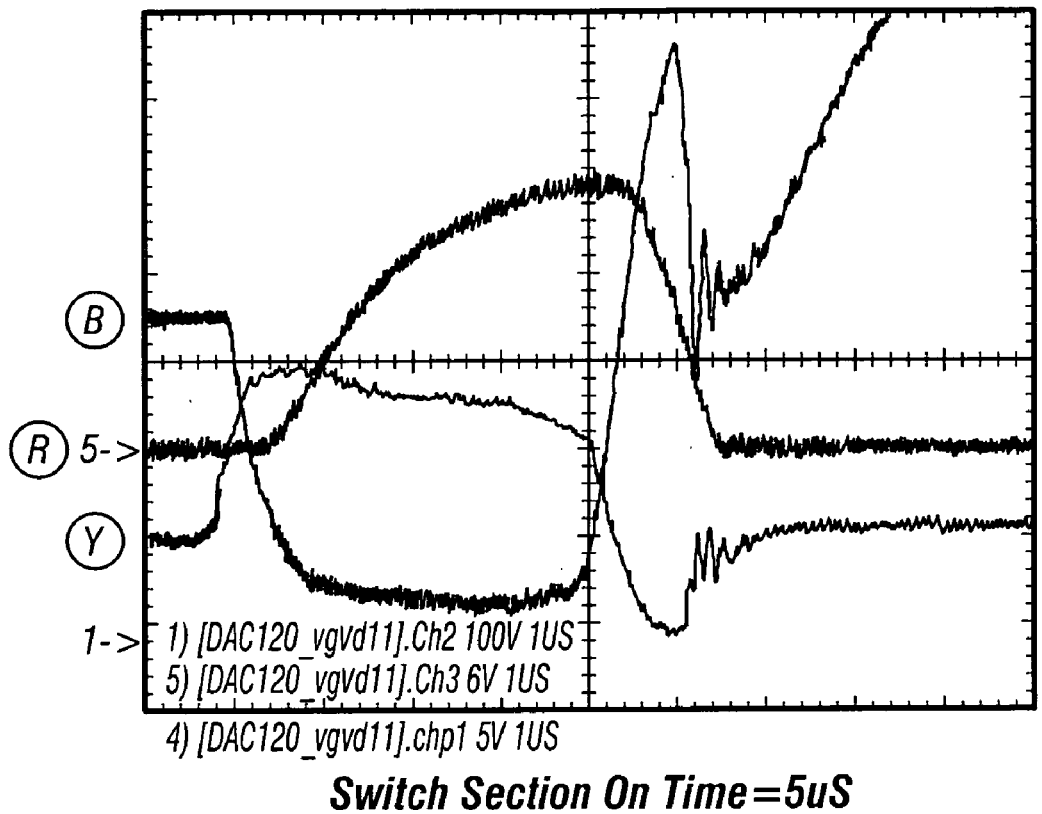

As seen in the embodiment of FIG. 3, when the MOSFET switch 80 is driven high to a voltage above threshold, the switch 80 saturates and provides conduction from the drain to source. Current then flows through the MOSFET switch 80 and the primary of the transformer 82 inducing load current in the output section 70 to the load. As seen in the waveforms presented in FIG. 4a, load current flows while the MOSFET switch is ON (saturated). The energy delivered to the load is controlled by the on time duration of the MOSFET gate drive signal. FIG. 4B shows load current for a gate drive duration of 2.4 μS and FIG. 4C shows load current for a gate drive duration of 5 μS.

Once the MOSFET drive signal is turned off, the core of transformer 82 is reset by returning the magnetizing current to the front end reservoir section through the resonant circuit consisting of the MOSFET Miller capacitance, the transformer primary inductance, and the transformer inter-winding capacitance. During this reset period there is no current flow in the MOSFET switch. This zero current switching enhances the overall electrical efficiency of the amplifier. This minimizes the amount of energy that is dissipated by the amplifier or returned to the reservoir. During this time, the output of the amplifier is electrically isolated from the load. The diode D1 is used in this embodiment to enable the electrical isolation.

Figure 5:
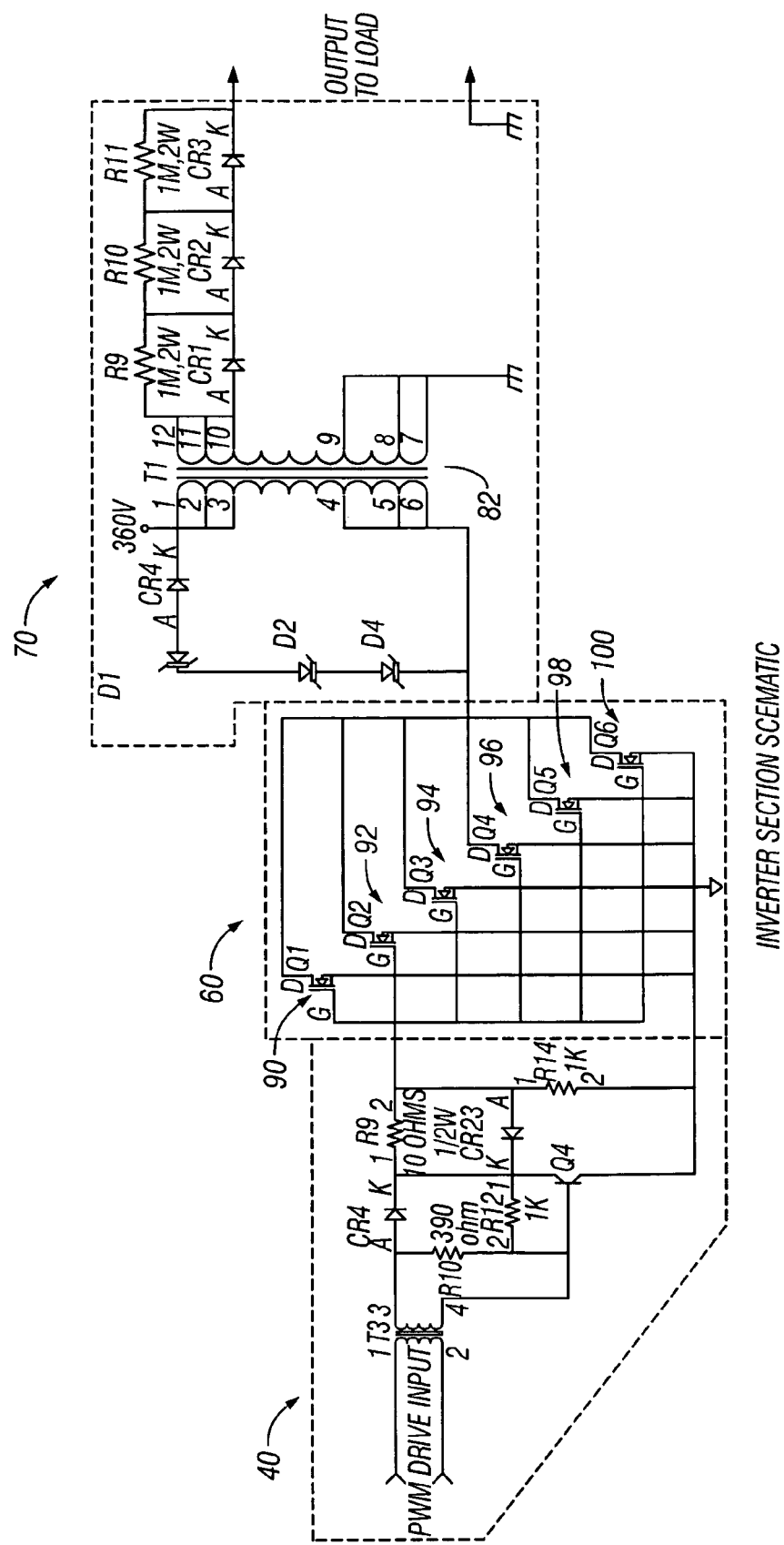
FIG. 5 shows a schematic for one embodiment of an amplifier according to the present invention.

The quantity of energy delivered to the load is proportional to the length of time that the switch 80 remains ON. The control logic in the control section 50 manages the output energy of the amplifier by varying the ON time of switch 80. The maximum switch ON time limit occurs when the core of transformer 82 saturates and that is a function of the transformer design. If the ON time reaches this limit, the switch current will exceed the capability of the MOSFET and the device will be destroyed. The ON time limit in the embodiment of FIG. 5 is 5 μS. Once the desired amount of energy is delivered, the gate of switch 80 is driven low to about 0 volts at which time the transformer core is reset.

FIG. 4 shows an oscilloscope image of the switch 80 drain voltage during switching at maximum duty cycle. To achieve the desired output, the present invention balances between all of the active components, working with the MOSFETS and their miller capacitance and the inductance available in a given size core in a transformer 82. Then, it is desirable to try to match that on the output side to a flash lamp. The switch section 60 and output section 70 should be compatible with the dynamic impedance of the flash lamp.

It should also be understood, however, that the maximum ON time (energy) for switch 80 is limited in part by the magnetic flux density of the transformer 82. For one embodiment of the present invention, that time is on the order of about 5 microseconds. As long as the ON time of the switch 80 stays under that range, the transformer 82 will not saturate. The magnetic flux density of the transformer 82 is determined in part by design, geometry, and material selection of the components used in the construction of the transformer 82. Specifically, when the switch or switches 80 turn on, the transformer 82 transfers energy to the load. When the switch 80 is turned off, the field collapses and the magnetizing energy is returned to the front end reservoir section as the transformer core resets. FIG. 4 shows the MOSFET switch drain voltage during a single cycle of operation. The switch is turned on at T0. The drain switches to 0V conducting current through the primary of the transformer. It is at this time that current flow is induced in the transformer secondary and power is delivered to the load. At T1 the MOSFET switch is turned off. In the period from T1 to T2 the resultant resonant circuit voltage resets the transformer core. The resonant circuit determines the reset time and consists of circuit reactances including the Miller capacitance of switch 80, the inter-winding capacitance of the transformer 82, and the primary inductance of the transformer 82. The period of this reset time is approximately equal to: $\pi\sqrt{(L_p \cdot C_{Q1})}$ Where $L_p$ is the transformer primary inductance and $C_{Q1}$ is the circuit capacitance.

In one embodiment, the switch not be active during this reset period such that the next pulse does not occur until the resonant reset of the core of transformer 82 is complete. Therefore the reset time is a factor in the maximum pulse frequency delivered to the lamp. The number of MOSFETS used in a given switch section determines the output impedance of the amplifier (more MOSFETS equals lower output impedance). However, an increase in the number of MOSFETS causes an increase in the reset time thus limiting the operating frequency (lengthening the PWM period). Since the most efficient transfer of energy to the lamp occurs when the amplifier and lamp impedances are matched, the number of MOSFET switches used is important. The switch section impedance is determined by the transformer design, the MOSFET switch characteristics and the number of MOSFET switches used. The amplifier output impedance is also a function of the number of amplifier modules used and the connection configuration of these modules (series, parallel, or combination). There is a series of design tradeoffs between the lamp design, transformer design, MOSFET switch characteristics, and module configuration all of which must be balanced.

In a typical resonant switching amplifier, the energy per pulse is fixed and is determined by the resonance of the switch capacitance, transformer reactances, and reflected reactance from the transformer secondary and load. Varying the operating frequency of a resonant amplifier controls the output energy. The output energy is then typically rectified, stored in a capacitor, then delivered to the load. Regulation is provided by feedback which is used to vary the amplifier operating frequency in response to load requirements.

In a typical non-resonant switching amplifier, the switch drive time is varied (PWM) to vary the energy delivered per pulse and the PWM period (or frequency) remains fixed. The output energy is typically rectified, stored in a capacitor, then delivered to the load. Regulation may be provided by feedback which is used to vary the switch on time (PWM duty cycle) in response to load requirements. The present invention rectifies but does not filter the output energy. Pulse energy (PWM) is delivered directly to the load. The present invention can use both pulse timing and frequency modulation to control energy delivered to the load.

Traditional resonant power supplies cannot provide variable energy per pulse. Rather the energy per pulse is fixed requiring fewer pulses per unit time be delivered to reduce output energy and more pulses per unit time to increase energy. This method in effect removes pulses which will cause the flash lamp to extinguish at low energy levels. Traditional PWM controlled power supplies use switch on time duty cycle to control energy and thus offer limited control range.

One embodiment of the present invention comprises the method of varying the pulse width as it would be in a non-resonant amplifier, but in this case, it is applied to MOSFETs. What makes this difficult is the gate capacitance inherent in MOSFETs, which must be overcome in order to control the switching. To vary the duty cycle, the MOSFET gate drive in the present embodiment should have a rise time of 100 nS or less. Furthermore, the gate capacitance of the MOSFETs is additive, which means that as the number of MOSFETs increases, the capacitive loading also increases. The present invention overcomes the gate capacitance with a high speed, current amplifier (Q4 in the FIG. 5). The current amplifier provides a large amount of current at a high slew rate to switch the MOSFET quickly. Specialized IC's can also provide high speed MOSFET gate drive.

The present invention, in one embodiment, uses a resonant reset, forward converter power topology, operating in a discontinuous mode. The output of this amplifier is controlled using pulse width modulation (PWM). The amplifier can also be controlled with frequency modulation or a combination of frequency modulation and PWM. The present invention can use this scheme to synthesize any type of current envelope directly to the load. When used with a lamp, the present invention relies in part on the persistence of the lamp to do part of the filtering and integration of the output pulses from the amplifier to create a smoothed output. Diodes in known devices do not integrate these pulses. With the present topology, driving the amplifier in this mode is accomplished in part by having the following elements. The drive circuit that drives the MOSFETs 80. It includes a drive transformer and a plurality of other switches. The maximum time that the energy is transferred to the load ('ON' time) is determined by the transformer design and switch design such that primary transformer current is interrupted before the transformer core is saturated. The maximum operating frequency is determined by the sum of the 'ON' time and the resonant reset time.

In some embodiments, the physical elements may include a flash lamp or some intermediate device to integrate the PWM output, any type of high speed switch (in this embodiment is the MOSFET 80), and an energy transfer media (MOSFET 80+transformer 82). In one embodiment, the high speed switch section 60 may deliver a plurality of pulses, each with a very small amount of energy to the flash lamp. The transfer medium used in combination can vary the amount of energy by varying energy content in each energy pulse. Because of this variability, this pulse forming network can synthesize any waveform and is not locked into a particular waveform. There is a significant cost reduction using the present invention since hardware does not need to be altered to generate new waveforms and there is substantially greater flexibility in waveforms available. In one embodiment, the energy per pulse is variable at a 200 Khz rate. From pulse to pulse, the present invention can vary the energy. This gives the ability to generate any waveform with a granularity of 100 kHz, or 200 kHz (assuming 2 amps are used at 100 khz), etc. In the present embodiment, the load can be used to integrate the envelope of pulses.

Referring now to FIG. 5, a more detailed embodiment of the present invention will now be described. The embodiment of FIG. 5 includes a plurality of MOSFET switches 80. In some embodiments, it is desirable to increase the output from the amplifier to achieve energy levels sufficient for higher intensity uses. One technique for increasing the energy output includes adding more MOSFET switches to the inverter topology as seen in FIG. 5.

Again, in the present embodiment, a portion of a resonant amplifier topology is used. It should be understood that in some embodiments, the present invention may be described as having a resonant reset topology. Specifically, the present invention uses the reset portion of the resonant amplifier and provides a transformer/inductor 82. As seen in FIG. 5, the switch section 60 includes a plurality of MOSFET switches 90, 92, 94, 96, 98, and 100. These switches 90-100 are coupled in a parallel configuration between elements of an input section and the energy transfer device, transformer 82.

When the switch or switches in section 60 are ON, energy is transferred energy through the transformer 82 to the load. When the switch section is turned off, the transformer core is reset by imposing a resonant voltage on the primary winding using the magnetizing energy in the transformer core is returned to the front end reservoir section through diode CR4 while resetting the core of transformer 82. It should be noted that, in the embodiment of FIG. 5, there is no current flow through the switches while the switches are transitioning from ON to OFF.

As a nonlimiting example, the design determines that in one embodiment, a switch that can handle 100 amps average and 600 amps peak is desired. This results in a total miller capacitance of 6 nF, so a primary inductance is desired of a small enough amount so the two of those together have a time constant that does not violate the fixed operating frequency desired to keep above the persistence time of the flash lamp. If 100 KHz operation is desired (10 µS period), and 5 µS energy pulse duration is desired, then the maximum allowable rest time is 5 µS. Using the resonance formula $\pi\sqrt{(L_p \cdot C_{Q1})}$ and solving for inductance ($L_p$), the primary inductance in the present embodiment should not exceed 420 µH. Some embodiments may desire to keep above 10 times the persistence time of the flash lamp. The resonant period should fit within the pulse width modulation frequency.

FIG. 5 shows more detail with regards to other elements used in the input section 40, switch section 60, and output section 70. As seen in FIG. 5, the input section 40 contains a scaling amplifier, pulse width modulator and output driver. The scaling amplifier amplifies the input signal to adequately drive the pulse width modulator which follows. The pulse width modulator is an oscillator in which the on time can be varied in response to the input signal. The pulse width modulator produces a fixed frequency square wave of which the on time is varied proportionately to the input signal. The output driver provides current amplification adequate to provide drive to the switch section.

The switch section 60 (described in detail in the previous paragraphs) provides energy transfer to the load and ensures electrical isolation from the load.

The output section consists of the transformer secondary, isolation diodes and balancing resistors. The output section couples the energy to the load and together with the switch section, provides impedance matching with the load. The transformer provides the coupling of energy from the switch section to the output and also provides the electrical isolation from the switch section and load. The isolation diodes prevent reversed current flow to the load during the transformer core reset period. The isolation diodes also prevent current flow from one module to another module when multiple modules are connected to one load. The transformer and diode isolation makes it possible to connect multiple modules to one load.

The control section consists of logic circuitry which can supervise the operation of the overall amplifier. The control section can monitor load current and limit the PWM duty cycle to a preset maximum value. The control section can also provide an arbitrary signal to the input scaling amplifier to drive the load with a synthesized arbitrary waveform. The control section can also vary the PWM frequency for low power applications.

The present invention can withstand a load of varying amount. The feature that allows the amplifier to withstand the negative impedance is that the sensitive element (the switch) is not involved directly in the transfer of energy into the load. Zero current switching is desirable. The energy is transferred by the transformer. So, it is transferred magnetically. Then the switch is turned off and the switch has a period time for it to turn off. The period of time is determined by its miller capacitance and the inductance of the transformer. No energy is transferred during the switching.

Thus as seen in FIG. 5, some embodiments of the present invention may be viewed as having a switch section, an output section having a transformer, isolation circuitry, and snubber circuitry. The present invention may include rectifiers (diodes) so that energy only goes to the load. The persistence of the load may be a design constraint that will influence the selection of these elements. It should be understood that in some embodiments, the lower the amplifier output impedance, the better. The ability to drive in parallel and series is desirable in some embodiments.

Figure 6:
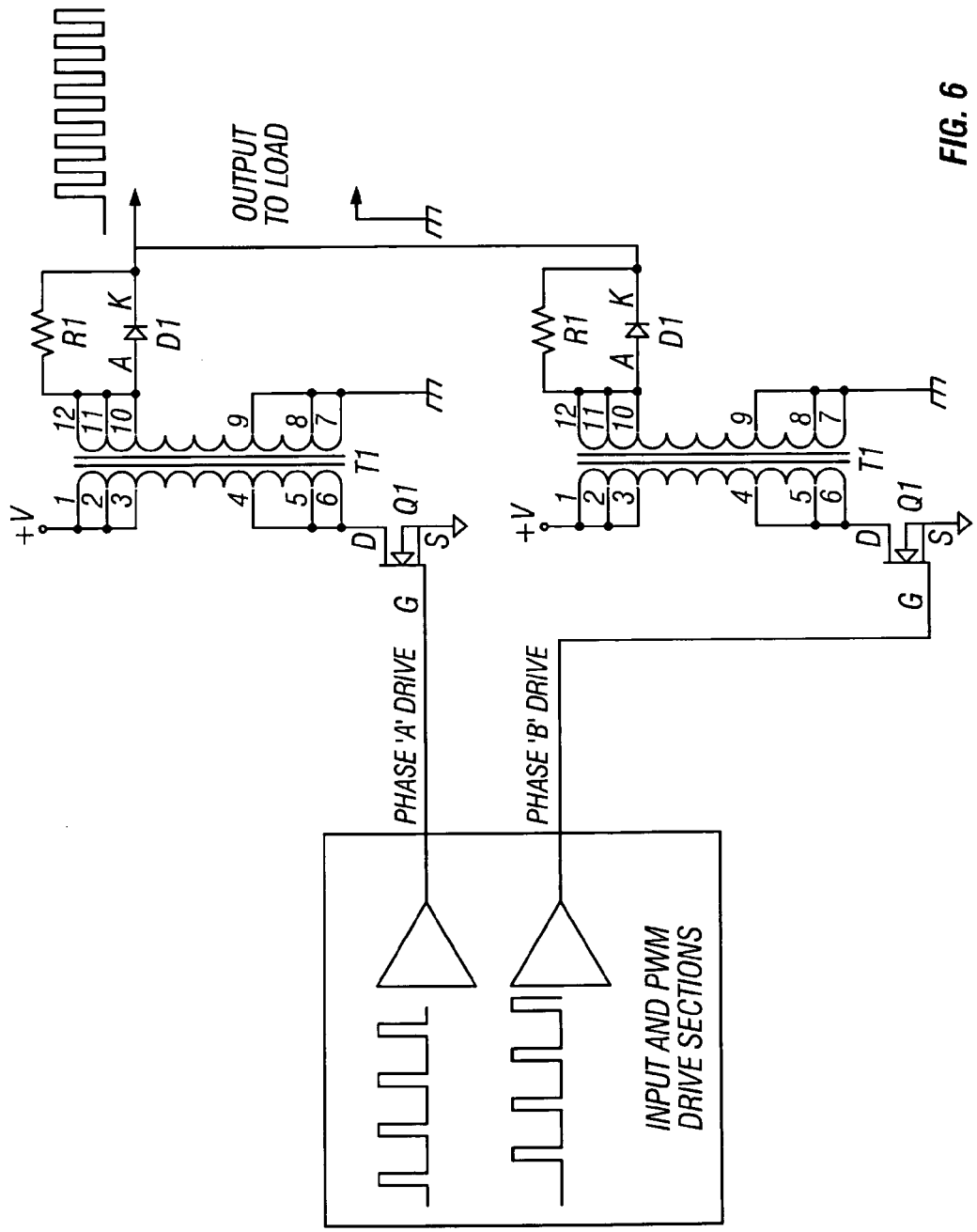
FIG. 6 shows an embodiment of the present invention where the outputs of two amplifiers are coupled together for a series drive configuration.

Referring now to FIG. 6, a schematic showing an amplifier using a single inverter section is shown. As seen, input and PWM drive sections provide the inverter section (having the switch section and the output section) to provide a pulsed output directly to the load.

Figure 7:
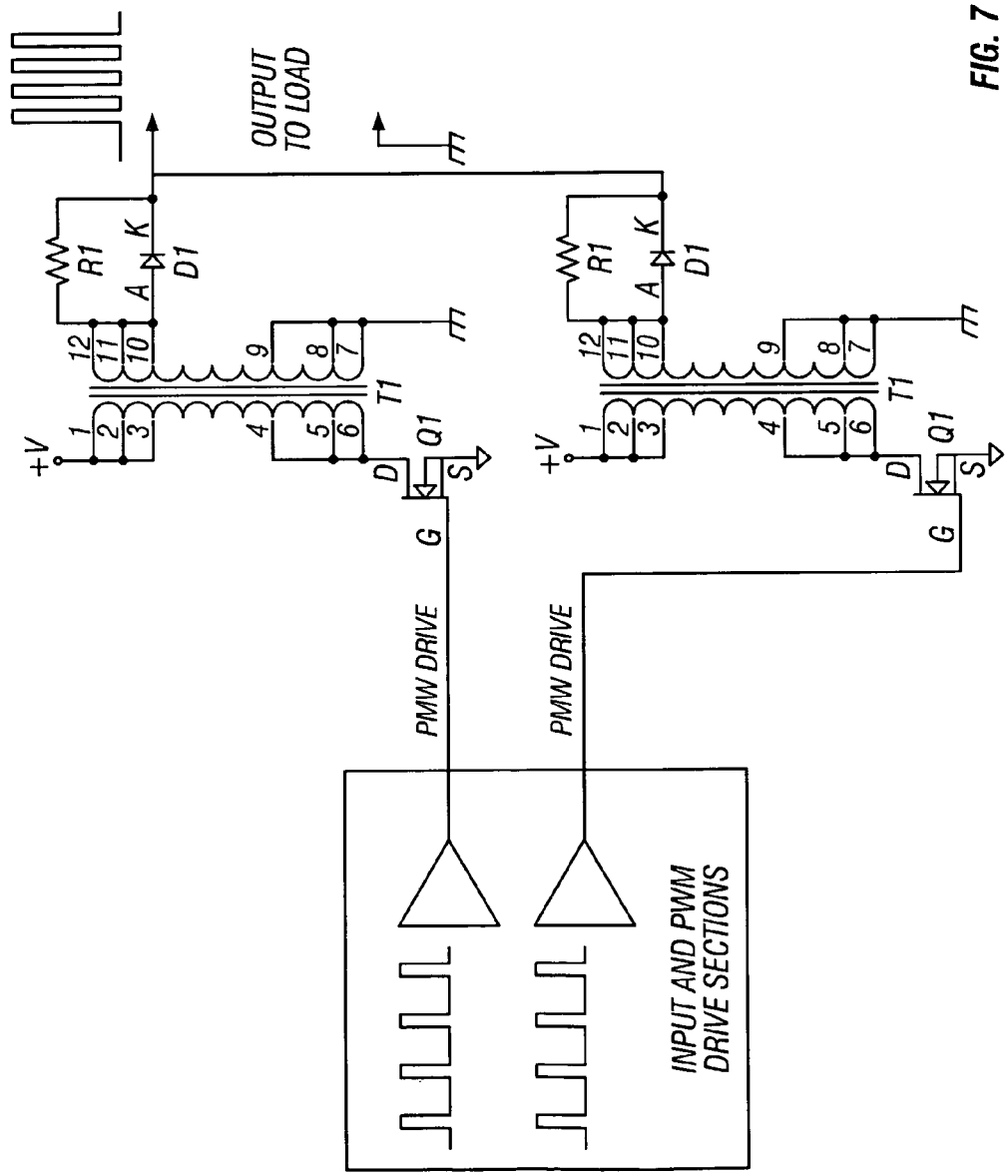
FIG. 7 shows an embodiment of the present invention where the outputs of two amplifiers are coupled together for a parallel drive configuration.

Referring now to the embodiment of FIG. 7, it should be understood that a parallel configuration may be used, having two inverter sections. This decreases the output impedance of the amplifier. This will increase the amplitude of the output pulse to a dynamic load such as but not limited to a flash lamp. The output section provides the isolation and allowing for connection of parallel switch sections. Transformers and switches may be added in the manner to improve performance.

Figure 8:
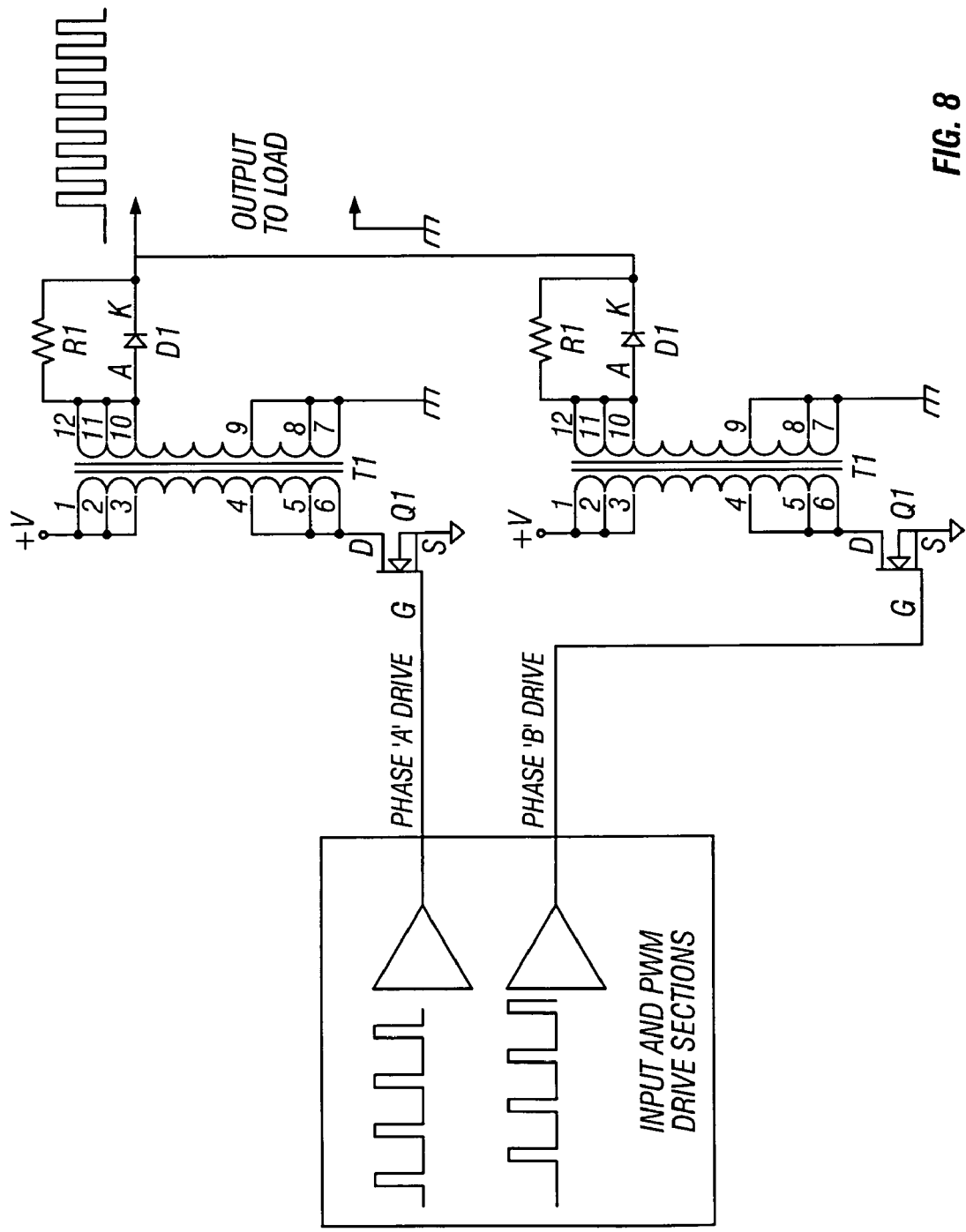
FIG. 8 shows an embodiment of the present invention where the outputs of two amplifiers are coupled together.

Referring now to the embodiment of FIG. 8, a still further variation shows that two inverter sections may be connected in parallel but driven in series. As seen, the input from the input and drive sections are out of phase. Specifically, they are driven out of phase by 180 degrees. This results in the delivery of pulses to the lamp or load twice as often, effectively doubling the power delivered to the load. In the present embodiment, about 80 kHz-100 kHz is a design range for the frequency of the amplifier. Such circuit has a resonant reset period of about 5 microseconds. There is only a certain amount time that energy can be stored in the device before the magnetic flux density is depleted and the storage saturates. 5 microseconds is the time before the device is turned off and allowed to reset. Thus, for this particular embodiment, one cannot put as much into this transformer core at this operating frequency. If the frequency is decreased, one can store more energy per pulse, deliver more to the load. This brought about the series configuration as described in FIG. 8. In one nonlimiting example, the power supplies may operate at 70 khz, but the lamp will receive twice as many pulses (140 khz drive) since there are two amplifiers supplying pulses out of phase.

Figure 9:
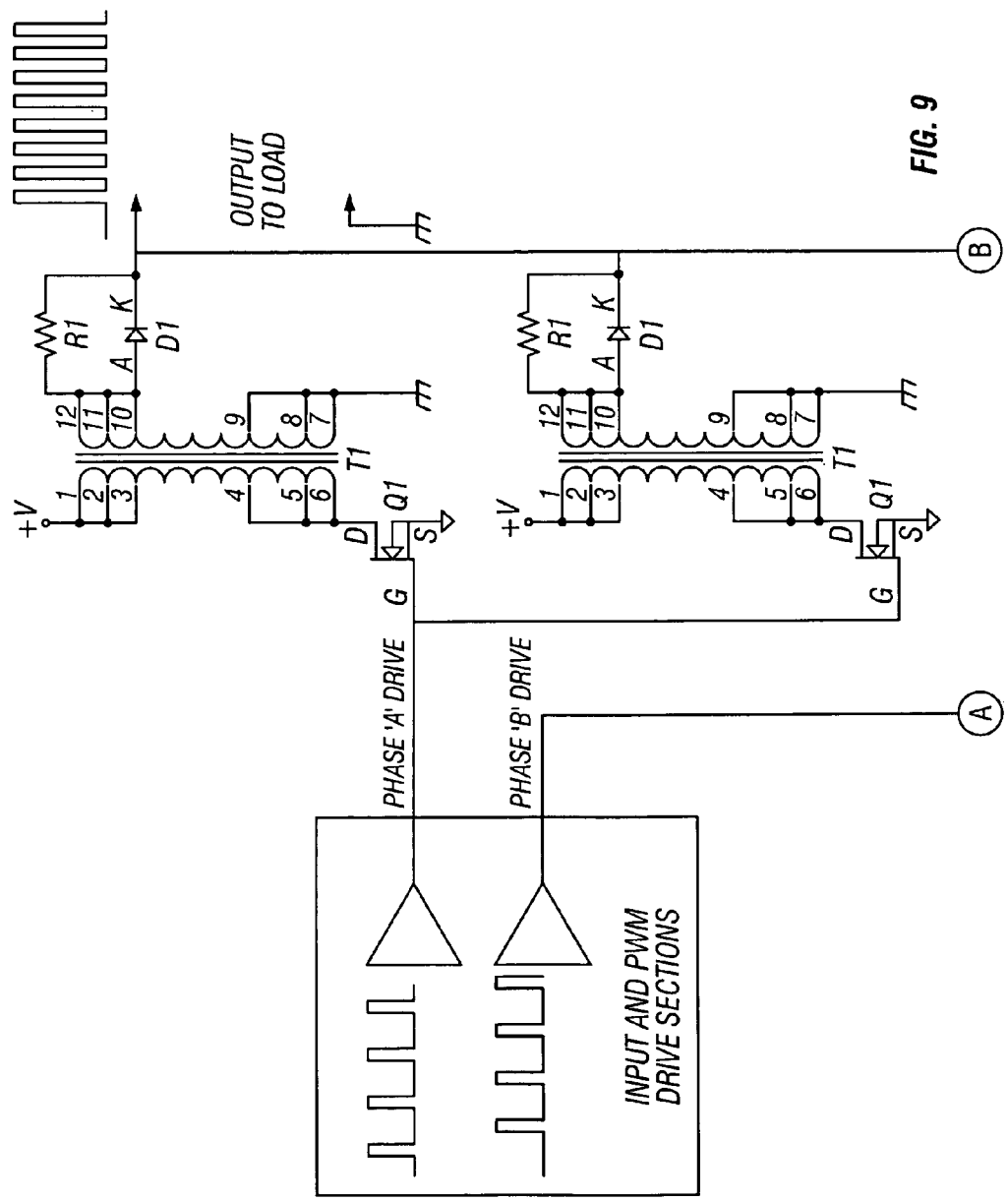
FIG. 9 shows an embodiment of the present invention where the outputs of two amplifiers are coupled together for series/parallel drive configuration.
Figure 9:
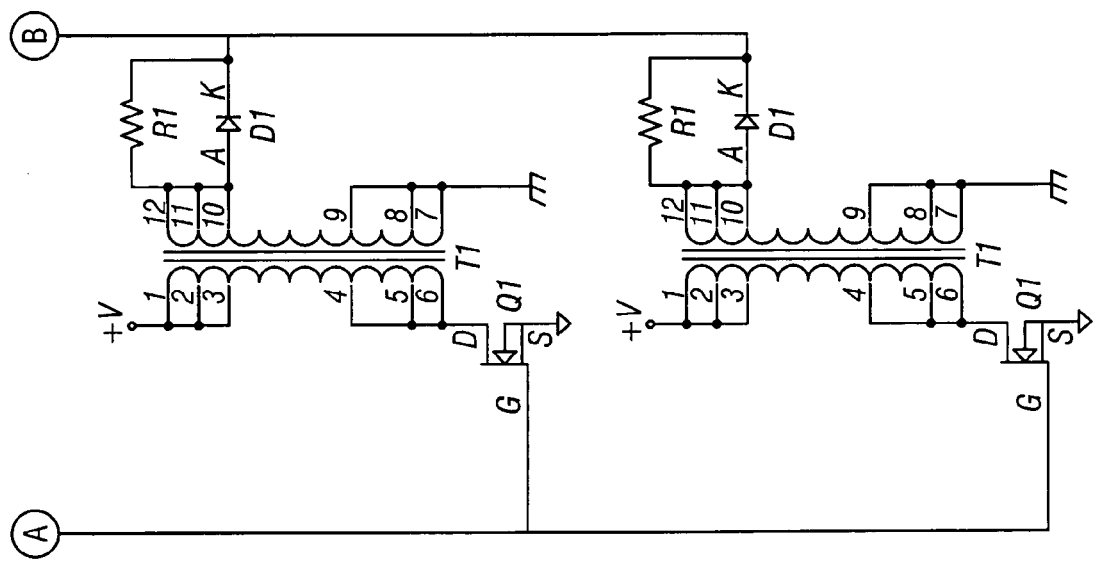

FIG. 9 shows a combination of amplifiers coupled together in a series and parallel drive configuration. It should be understood that these changes in driving the amplifiers do not change the physical or actual connection to the lamp. Most of these changes occur in software.

Figure 10:
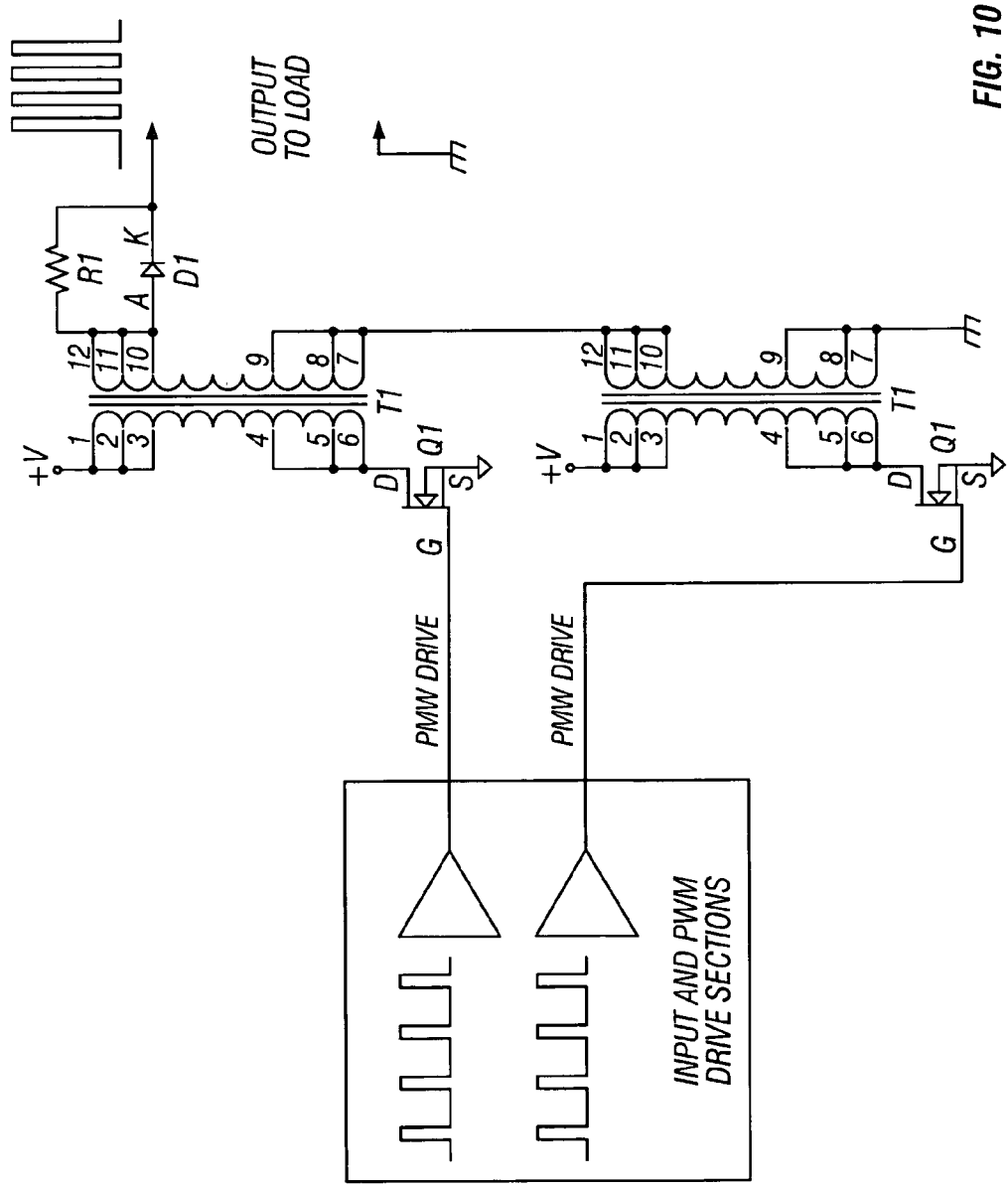
FIG. 10 shows an embodiment of the present invention where the outputs of two amplifiers are coupled together for in-phase, series drive configuration.

Referring now to the embodiment of FIG. 10, a still further variation shows that the outputs of two inverter sections may be connected in series but driven in parallel. This increases the output voltage delivered to the load.

Applications:

The power supplies of the present invention may be advantageously used in a variety of applications.

As a nonlimiting example, the embodiments of the present invention may be used to address the issue of thermal lensing that occurs in laser systems. Thermal lensing is undesirable as it changes the operating parameters of the laser. Although not limited to the following, the present example uses a YAG laser operating at 10 hz. The present method involves maintaining a constant thermal load on the gain medium over a period of time. Thus, even though the rep rate of the laser may vary, the amount of energy delivered to the rod or gain medium is the same over a period of time. In this way, thermal lensing does not change since the thermal load does not change.

Figure 11:
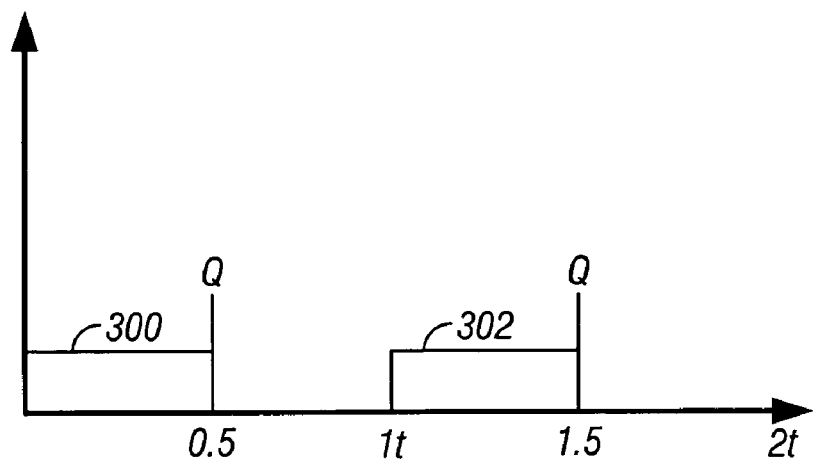
FIGS. 11-14 show graphs of Q switch rates of operation.
Figure 12:
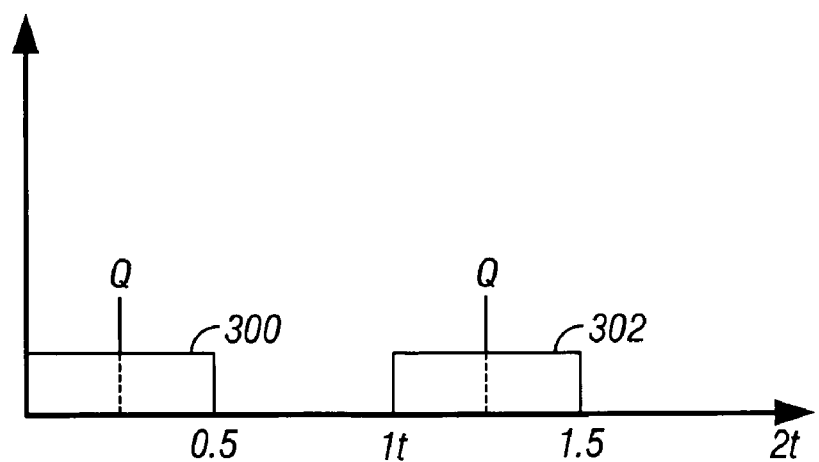
Figure 13:
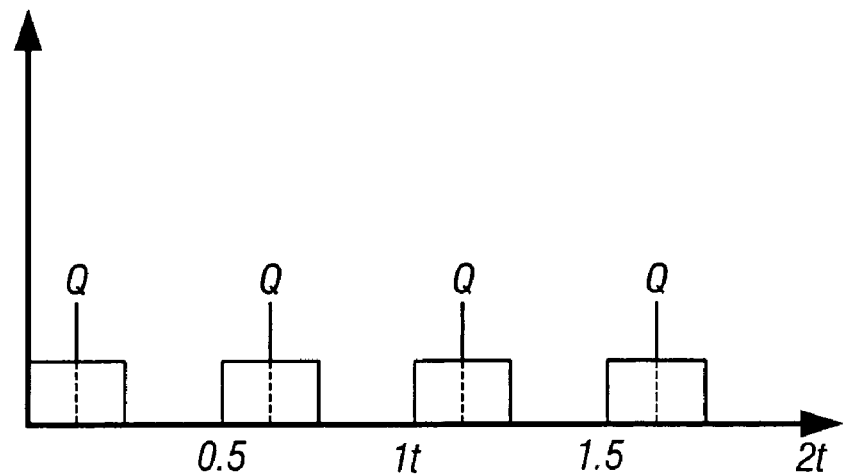

Referring now to FIGS. 11-13, in one embodiment of the present invention, this may involve extending pulse duration to maintain constant thermal loading. The pump conditions may be adjusted so that the amount of energy delivered to the gain medium over a period time of X is always constant. In FIG. 11, the period of is 2t. The pulses are adjusted and Q-switched to achieve the desired energy output and rep rate. Because the pulse width is variable, it can be adjusted with the rep rate to maintain the same thermal load on the gain medium. The present invention provides a thermal load of N per pulse and the loading would be N divided by frequency per pulse. FIG. 11 shows that energy is provided to the gain medium over a period of time from 0 to 0.5 t and 1 t to 1.5 t. The laser is Q-switched at the end of each pulse. In FIG. 12, the same amount of energy is delivered to the gain medium as indicated by pulses 300 and 302. The Q-switch may be varied to change the rep rate and/or energy from the laser, but the thermal load on the gain medium remains the same over the same period of time as that in FIG. 11. FIG. 13 shows that the rep rate is increased, but again, the total amount of energy seen by the gain medium is the same and the thermal loading over the time 2 t in FIG. 13 is the same as the thermal loading in FIG. 11.

The constant thermal load may be accomplished, in one embodiment, by Q-switching the laser to deliver the laser light but still allowing energy to heat the rod after the Q-switch. After the buildup, the Q-switch is fired. In one example, the laser fires at 10 hz, so if 25 joules are put into the laser 10 times a second (250 watts), about 2.5 watts come out as laser light (e.g. about 1% comes out). The remainder goes to heat the YAG laser rod. The problem with all YAG lasers is that they are fixed point operating systems. With more heat, the lense gets sharper, with less heat the lense is less sharp. The thermal lense is a function of rep rate and corrective optic. Different laser rods have different thermal lenses.

Figure 14:
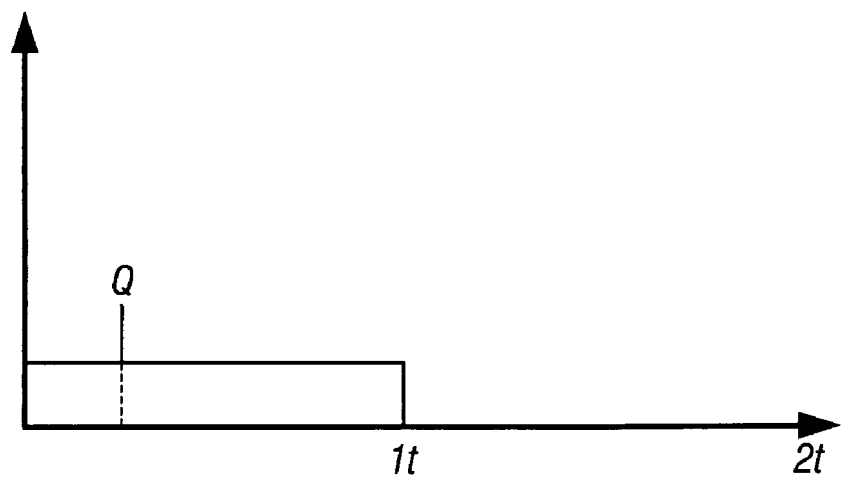

With the present invention, the amplifier can maintain constant thermal loading or constant watts. As a nonlimiting example, if the laser operates at 50 hz (200 ms), 1250 watts are put into the laser per second. This creates a very sharp lense since there is substantial heating in the rod. Typically, changing the frequency of the laser will change the thermal load on the laser and result in a different thermal lensing to correct for. The present invention may be used to maintain a constant thermal lens, even when the laser operates at varying rep rate. The amplifier may vary its output to maintain the constant thermal load, while also adjusting for varying rep rates for the laser. The laser may be Q-switched to deliver the laser energy at a desired frequency. However, the remainder of the time, the amplifier will be used to deliver energy to the rod to keep the rod warm. Thus in the present example, if the laser operates at 12 hz, the YAG rod still sees 1250 watts. The Q switch may occur every 12th pulse, but again the heat load on the laser rod remains the same since the same amount of energy is still delivered to the laser rod. The Q switching is varied. FIG. 14 shows another embodiment where the Q-switch occurs at a lower rep rate. Again, the thermal load over the period 2 t is the same in FIG. 11 and in FIG. 14.

While the invention has been described and illustrated with reference to certain particular embodiments thereof, those skilled in the art will appreciate that various adaptations, changes, modifications, substitutions, deletions, or additions of procedures and protocols may be made without departing from the spirit and scope of the invention. For example, with any of the above embodiments, a variety of protection elements may be included in the circuit design to minimize heating of the elements. In some embodiments, the present invention may be viewed as having two elements (switch+transformer) with a certain result in a resonant topology. Embodiments of the present invention may use gapped or ungapped transformers. It should be understood that some embodiments may have output energy is typically rectified, stored in a capacitor, then delivered to the load. For other applications using any of the embodiments described herein, other light sources can be powered. Incandescent, fluorescent lamps, diodes, LEDS, metal vapor lamps, and other light sources can be powered by the amplifier according to the present invention.

The publications discussed or cited herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed. All publications mentioned herein are incorporated herein by reference to disclose and describe the structures and/or methods in connection with which the publications are cited. This application is related to U.S. application Ser. No. 11/053195 filed on Feb. 7, 2005 and fully incorporated herein by reference for all purposes.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either both of those included limits are also included in the invention.

While the above is a description of the preferred embodiments of the invention, various alternatives, substitutions and modifications may be made without departing from the scope thereof, which is defined by the following claims. Thus, the preferred embodiments should not be taken as limiting the scope of the invention. Furthermore, the present invention is directed to a number of separate inventions and each of these inventions may be claimed independently of one another. Each feature, aspect and advantage of the invention may be claimed independent of one another without departing from the scope of the invention. Thus, the invention does not include a single essential feature, aspect or advantage and the invention should not be limited as such. It is intended, therefore, that the invention be defined by the scope of the claims which follow and that such claims be interpreted as broadly as is reasonable.

What is claimed is:

1. A method for driving a flash lamp, said method comprising:
   providing an amplifier that has as part of said amplifier a resonant reset topology, said amplifier being configured to vary a duty cycle in response to a signal presented to an input;
   coupling an output of said amplifier to said flash lamp to provide a pulsed power output to the flash lamp; and
   driving said amplifier with a controller to provide a pulse width modulation output to said flash lamp;
   said pulse width modulation output having a period selected to prevent a streamer of said flash lamp from extinguishing during an active use, wherein an amount of time in said period is fixed, and an amount of time that pulses are delivered during said period is variable.

2. The method as in claim 1 wherein said output of said amplifier is coupled directly to the flash lamp without a filter to smooth the pulsed power output.

3. The method as in claim 1 wherein flash lamp pulse envelope is a function of both the number of pulses beneath the envelope and the duration of each pulse due to the pulse width modulation.

4. The method as in claim 1 wherein said period is no more than 1/10th of an arc persistence time of the flash lamp.

5. The method as in claim 1 wherein said period is less than 20% of an arc persistence time of the flash lamp.

6. The method as in claim 1 wherein said period is less than 50% of an arc persistence time of the flash lamp.

7. The method as in claim 1 wherein said period is no greater than an arc persistence time of the flash lamp.

8. The method as in claim 1 further comprising using at least one MOSFET switch in said amplifier.

9. The method as in claim 1 further comprising using at least three MOSFET switches in a switch section of said amplifier.

10. The method as in claim 1 further comprising using at least six MOSFET switches in a switch section of said amplifier.

11. The method as in claim 1 further comprising using a controller to vary output energy of the power supply, said controller varying at least one of the following to adjust energy output: varying the period of the amplifier or varying the duration of each pulse of the amplifier output.

12. The method of claim 1, wherein the controller varies the output energy to be proportional to an input signal, said energy is proportional to an "on" time of a MOSFET switch during the period.

13. The method of claim 1, wherein the controller varies the output energy to be proportional to an input signal.

14. The method of claim 1, wherein the controller is part of a feedback loop.

15. The method as in claim 1 wherein a maximum "on" time of said MOSFET switch per period is determined in part by a magnetic flux density of a transformer in the amplifier that is upstream from the output, wherein the flux density determines a saturation time for the transformer.

16. The method as in claim 1 wherein a transformer used in said amplifier and coupled to a MOSFET switch is a gapped transformer to increase time to transformer saturation.

17. The method as in claim 1 wherein a transformer used in said amplifier and coupled to a MOSFET switch is an ungapped transformer.

18. The method as in claim 1 further comprising transferring energy in a transformer in the switch, wherein the amount of energy delivered to the lamp is determined by a length of time that a MOSFET switch in the amplifier remains on and stores energy in a transformer in the amplifier.

19. The method as in claim 1 further comprising using a flash lamp to integrate and filter the pulse width modulation output of the amplifier to generate a smooth output curve.

20. The method as in claim 1 further comprising using a filter upstream from the load to integrate and filter the pulse width modulation output of the amplifier to generate a smooth output curve.

21. The method as in claim 1 further comprising varying the duty cycle of the pulse width modulation to generate an output from the flash lamp proportional to an input signal.

22. The method as in claim 1 further comprising varying the duty cycle of the pulse width modulation to generate at least one of the following waveforms from the flash lamp: nonlinear, square, and/or arbitrary.

23. The method as in claim 1 further comprising driving the amplifier to provide at least 2 volts output to the flash lamp.

24. The method as in claim 1 further comprising driving the amplifier to provide at least 200 volts output to the flash ramp.

25. The method as in claim 1 further comprising driving the amplifier to provide at least 500 volts output to the flash lamp.

26. The method as in claim 1 further comprising driving the amplifier to provide at least 900 volts output to the flash lamp.

27. The method as in claim 1 further comprising driving the amplifier to provide at least 1000 volts output to the flash lamp.

28. The method as in claim 1 further comprising driving the amplifier to provide at least 1500 volts output to the flash lamp.

29. The method as in claim 1 further comprising:
coupling a second amplifier to provide a pulse width modulation output to said flash lamp.

30. The method as in claim 1 further comprising:
driving said second amplifier to provide an output in-phase with the output of the first amplifier.

31. The method as in claim 1 further comprising driving said second amplifier to provide an output out-of-phase with the output of the first amplifier.

32. The method as in claim 1 further comprising driving said second amplifier to provide an output out-of-phase with the output of the first amplifier, said out-of-phase output at one of the following phase angles: 180, 120, or 90.

33. The method as in claim 1 wherein the first amplifier comprises a plurality of MOSFET switches.

34. The method as in claim 1 wherein the amplifier is driven at a rep rate of about 100 to 300 kHz.

35. The method as in claim 1 wherein the fixed period is selected to be less than about 5 ms.

36. The method as in claim 1 wherein the fixed period is selected to be less than about 10 ms.

37. The method as in claim 1 further comprising a controller to drive the amplifier in a discontinuous mode.

38. The method as in claim 1 further comprising isolating the output of the amplifier from the flash lamp when said flash lamp is in a negative impedance mode.

39. The method as in claim 1 further comprising isolating the output of the amplifier from the flash lamp during a non-energy transfer mode.

40. The method as in claim 1 said amplifier heats the flash lamp at a rate such that sputtering is minimized.

41. The method as in claim 1 wherein said lamp comprises a xenon lamp.

42. A system comprising:
a flash lamp having a flash lamp impedance and an arc persistence time when the flash lamp is lit;
an amplifier having a topology configured to provide PWM power output directly to the flash lamp, said amplifier configured to vary a duty cycle in response to a signal presented to an input;
an amplifier driver configured to drive said amplifier, said driver having a fixed or variable frequency control that provides the PWM power output at a frequency such that the period of the power output does not exceed the persistence time of a flash lamp during energy delivery, wherein an amount of time in said period is fixed, and an amount of time that pulses are delivered during said period is variable.

43. The system of claim 42 wherein the amplifier driver is configured to drive said amplifier to provide a PWM output at a frequency of no slower than 1/10th of a persistence time of a flash lamp.

44. A system of claim 42 wherein comprising:
said amplifier having a low output impedance, wherein the output impedance of the amplifier is less than 1/50 of the impedance of the lamp in a confined discharge mode.

45. A method of manufacturing an amplifier for use with a dynamic load, said method comprising:
providing at least one switch section in said amplifier;
providing at least one output section in said amplifier, said amplifier varying a duty cycle in response to a signal presented to an input;
providing a controller, wherein the switch section is controlled so that the output section delivers an energy output to said dynamic load, said output comprising a plurality of pulses each being spaced apart by a period of time, said controller configured to vary the width of each of said pulses in said period of time to vary the amount of energy delivered to the dynamic load, wherein an amount of time in said period is fixed, and an amount of time that pulses are delivered during said period is variable.

46. The method as in claim 45 further comprising installing a plurality of MOSFET switches to adjust impedance of the amplifier.

47. The method as in claim 45 further comprising providing a transformer to transfer energy from the switch section to the output.

48. The method as in claim 45 further comprising providing about 25 joules per flash.

* * * * *